United States Patent
Gireesh et al.

(10) Patent No.: US 10,227,908 B2
(45) Date of Patent: Mar. 12, 2019

(54) INLET DIFFUSER FOR EXHAUST AFTERTREATMENT SYSTEM

(71) Applicant: Caterpillar Inc., Peoria, IL (US)

(72) Inventors: Guru Gireesh, Peoria, IL (US); Arvind Jujare, Peoria, IL (US); Tim T. Trubnikov, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 98 days.

(21) Appl. No.: 15/366,136

(22) Filed: Dec. 1, 2016

(65) Prior Publication Data

US 2018/0156093 A1    Jun. 7, 2018

(51) Int. Cl.
*F01N 3/00* (2006.01)
*F01N 3/28* (2006.01)
*F01N 3/035* (2006.01)
*F01N 3/20* (2006.01)
*F01N 3/08* (2006.01)
*F01N 3/10* (2006.01)
*F01N 3/021* (2006.01)
(Continued)

(52) U.S. Cl.
CPC ........... *F01N 3/2892* (2013.01); *F01N 3/035* (2013.01); *F01N 3/206* (2013.01); *F01N 3/2066* (2013.01); *F01N 3/021* (2013.01); *F01N 3/0814* (2013.01); *F01N 3/103* (2013.01); *F01N 3/105* (2013.01); *F01N 2240/20* (2013.01); *F01N 2250/02* (2013.01); *F01N 2470/02* (2013.01); *F01N 2470/04* (2013.01); *F01N 2470/18* (2013.01); *F02M 26/15* (2016.02); *F02M 26/19* (2016.02)

(58) Field of Classification Search
USPC ......... 60/272, 274, 299, 301, 302, 303, 312, 60/313, 322, 323, 324
See application file for complete search history.

(56) References Cited

U.S. PATENT DOCUMENTS 4,209,495 A    6/1980    Kobayashi et al.
6,712,869 B2   3/2004    Cheng et al.
(Continued)

FOREIGN PATENT DOCUMENTS

JP     2012140964       7/2012
WO     WO 2005/059324 A1    6/2005
(Continued)

*Primary Examiner* — Binh Q Tran
(74) *Attorney, Agent, or Firm* — Leydig, Voit & Mayer, Ltd.

(57) ABSTRACT

An exhaust aftertreatment system includes a housing including first and second axial ends. An exhaust inlet is disposed adjacent the first axial end. An exhaust outlet is disposed adjacent the second axial end. A catalytic converter is disposed between the first and second axial ends. A diffuser is disposed inside the housing between the first axial end and the catalytic converter. The diffuser includes a shell in communication with the exhaust inlet. The shell includes proximal and distal portions and a front side facing the catalytic converter. The proximal and distal portions are substantially equal in frontal area. The proximal portion is adjacent the exhaust inlet and includes a first plurality of front side openings totaling a first open area and the distal portion includes a second plurality of front side openings totaling a second open area. The first open area is about 1.8-2.2 times the second.

20 Claims, 4 Drawing Sheets

(51) Int. Cl.
*F02M 26/15* (2016.01)
*F02M 26/19* (2016.01)

(56) References Cited

U.S. PATENT DOCUMENTS

| | | | |
|---|---|---|---|
| 8,286,421 B2* | 10/2012 | Dickinson | F01N 13/082 60/317 |
| 8,359,838 B2* | 1/2013 | Yamazaki | B01D 53/90 60/295 |
| 8,539,761 B2 | 9/2013 | Lebas et al. | |
| 8,635,861 B2* | 1/2014 | Sun | F01N 3/021 60/272 |
| 8,745,979 B2 | 6/2014 | Sedlacek et al. | |
| 9,097,161 B2 | 8/2015 | Vanvolsem et al. | |
| 9,617,887 B2* | 4/2017 | Niaz | F01N 3/2892 |
| 2003/0051449 A1 | 3/2003 | Nishiyama et al. | |
| 2006/0008397 A1 | 1/2006 | Bruck | |
| 2008/0216470 A1 | 9/2008 | Sedlacek et al. | |
| 2009/0266064 A1 | 10/2009 | Zheng et al. | |
| 2011/0167810 A1 | 7/2011 | Lebas et al. | |
| 2012/0151902 A1 | 6/2012 | Yi et al. | |
| 2012/0227390 A1 | 9/2012 | Wikaryasz et al. | |
| 2014/0260209 A1* | 9/2014 | Goss | F01N 3/2803 60/295 |
| 2015/0361852 A1 | 12/2015 | Nagata et al. | |
| 2016/0215673 A1* | 7/2016 | Noren, IV | F01N 3/2892 |

FOREIGN PATENT DOCUMENTS

| | | |
|---|---|---|
| WO | 2010032077 | 3/2010 |
| WO | WO 2010/133412 A2 | 11/2010 |
| WO | 2016160633 | 10/2013 |
| WO | WO 2015/091242 A1 | 6/2015 |

* cited by examiner

INLET DIFFUSER FOR EXHAUST AFTERTREATMENT SYSTEM

TECHNICAL FIELD

This disclosure relates generally to exhaust aftertreatment systems and more particularly to exhaust aftertreatment systems employing a diffuser element.

BACKGROUND

In a traditional exhaust aftertreatment system (ATS), the distance between an inlet port that delivers engine exhaust gases to the system and the face of a diesel oxidation catalyst (DOC) portion of the system is typically great enough to provide adequate flow uniformity before the exhaust gas flow impinges upon face of the DOC. In addition, when the exhaust gas enters the DOC in a straight line from the inlet port, flow tends to be uniform. Exhaust aftertreatment systems may include an inlet diffuser located between the gas exhaust inlet port and the DOC face to additionally enhance the uniformity of the distribution of the exhaust gas stream flow. It is also desirable to use an inlet diffuser when the ATS utilizes hydrocarbon dosing to distribute the dosing material evenly.

Design requirements for some engine and work machine configurations necessitates substantially shortening the distance between the exhaust gas inlet port and the DOC face of the exhaust aftertreatment system in addition to utilizing hydrocarbon dosing. Also, the piping configuration used upstream of the exhaust aftertreatment system and the DOC outlet has an impact on the flow uniformity, which makes it more difficult to achieve a desired flow uniformity.

The disclosed system is directed to overcoming one or more of the problems set forth above and/or other problems of the prior art.

SUMMARY

The present disclosure is generally directed in one aspect, to an exhaust aftertreatment system includes a housing with first and second axial ends. An exhaust inlet is disposed adjacent the first axial end. An exhaust outlet is disposed adjacent the second axial end. A catalytic converter is disposed between the first and second axial ends. A diffuser is disposed inside the housing between the first axial end and the catalytic converter. The diffuser includes a shell in communication with the exhaust inlet. The shell includes proximal and distal portions and a front side facing the catalytic converter. The proximal and distal portions are substantially equal in frontal area. The proximal portion is adjacent the exhaust inlet and includes a first plurality of front side openings totaling a first open area and the distal portion includes a second plurality of front side openings totaling a second open area. The first open area is about 1.8-2.2 times the second.

In another aspect the disclosure provides a method of operating an exhaust aftertreatment system, including generating, by an engine, exhaust gases. The exhaust gases are conveyed from the engine to the exhaust aftertreatment system through an exhaust conduit. The exhaust gases are directed into a diffuser. The exhaust gases are diffused through a plurality of openings formed through a front side of the diffuser, wherein the openings include a first plurality of openings formed through a proximal portion of the diffuser and a second plurality of openings formed through a proximal portion of the diffuser. Flow is restricted through the second plurality of openings relative to flow through the first plurality of openings.

Further and alternative aspects and features of the disclosed principles will be appreciated from the following detailed description and the accompanying drawings. As will be appreciated, the principles related to end cutting-bits disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
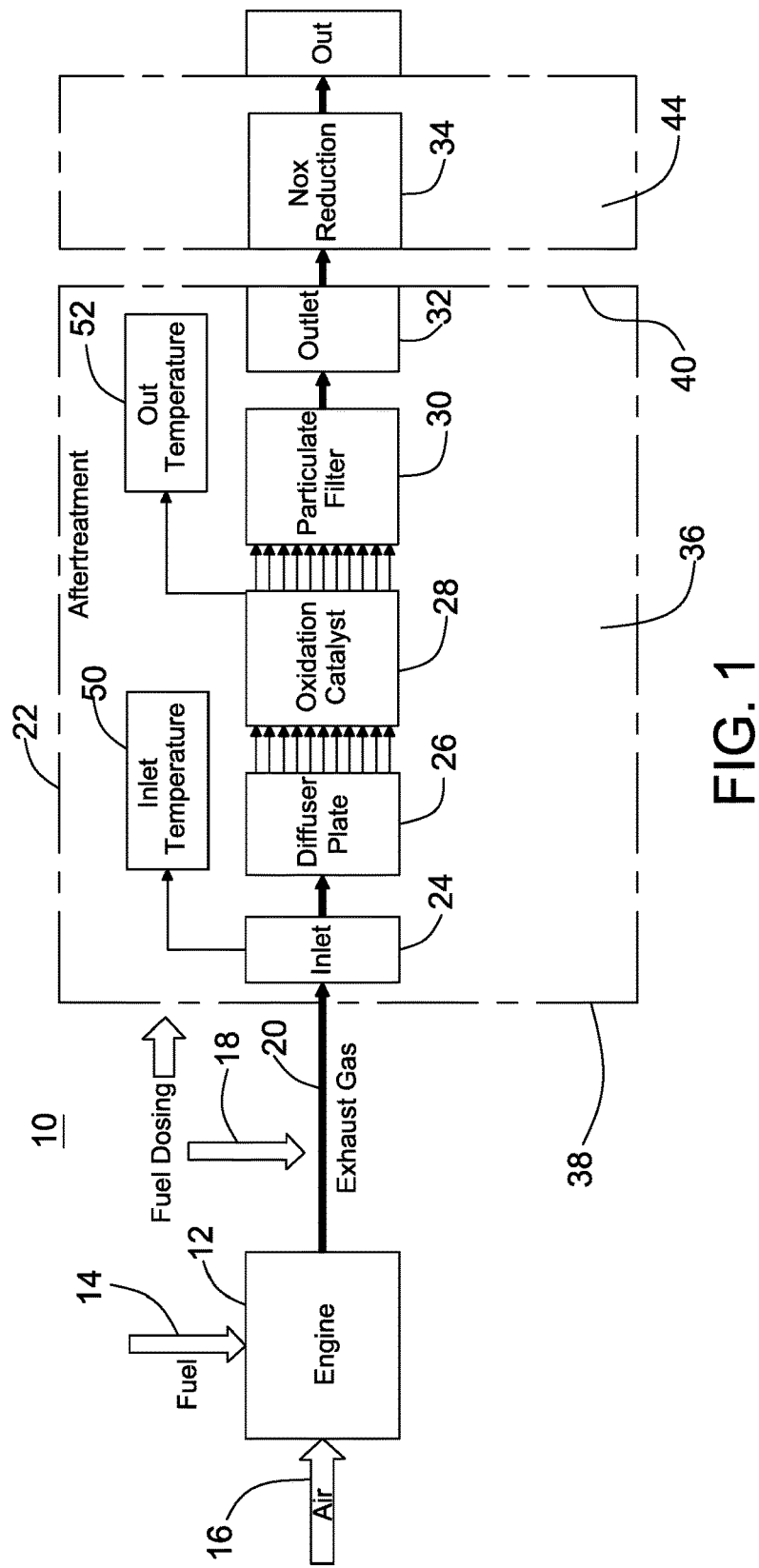
FIG. 1 is a diagram of an engine system and an exhaust aftertreatment system according to an embodiment of the disclosure.

FIG. 1 illustrates an engine system 10. The engine system 10 may be part of any work machine, such as skid steers, wheel dozers, wheel loaders, track loaders, backhoe loaders, compactors, forest machines, front shovels, hydraulic excavators, integrated tool carriers, multi-terrain loaders, material handlers, and agricultural tractors, an earth-moving machine, such as a wheel loader, excavator, dump truck, backhoe, locomotive, paver, or the like. Apart from mobile machines, the work machine contemplated may be a stationary or portable machine such as a generator set, an engine driving a gas compressor or pump, and the like.

The engine system 10 may include an engine 12, a fuel tank 14 to supply fuel (e.g., diesel fuel) to the engine 12, an air intake 16 to direct air into the engine, and an exhaust conduit 20 for conveying exhaust gas away from the engine 12. The engine 12 may be any type of diesel engine, for example. The engine 12 may include other features not shown, such as controllers, fuel systems, air systems, cooling systems, peripheries, drive train components, turbochargers, exhaust gas recirculation systems, etc. The exhaust conduit 20 may include a fuel dosing system 18.

The engine system 10 includes an exhaust aftertreatment system, generally designated 22, which receives and treats exhaust gas generated by the engine 12. The exhaust conduit 20 conveys exhaust gas from the engine 12 to the exhaust aftertreatment system 22.

The exhaust aftertreatment system 22 includes a first housing 36, which may be metal or any suitable material. The housing 36 includes a first axial end 38 connected to and in communication with the exhaust conduit 20 via an inlet 24. The first housing 36 includes a second axial end 40 opposite and downstream from the first axial end, which includes an outlet 32 to permit the exit of treated exhaust gas. Exhaust gas from exhaust conduit 20 enters the first axial end 38 and exits the second axial end 40 of the first housing 36 of the exhaust aftertreatment system 22 by passing through exhaust gas elements that treat the gases. The exhaust gas may also be further treated in a second housing 44, which may contain further treatment elements.

The dosing system 18 may, in the alternative, be disposed on the first housing 36 and/or in communication with the first housing to deliver hydrocarbon materials as is well known into the exhaust gas flow at or near the first axial end 38 of the first housing.

Figure 2:
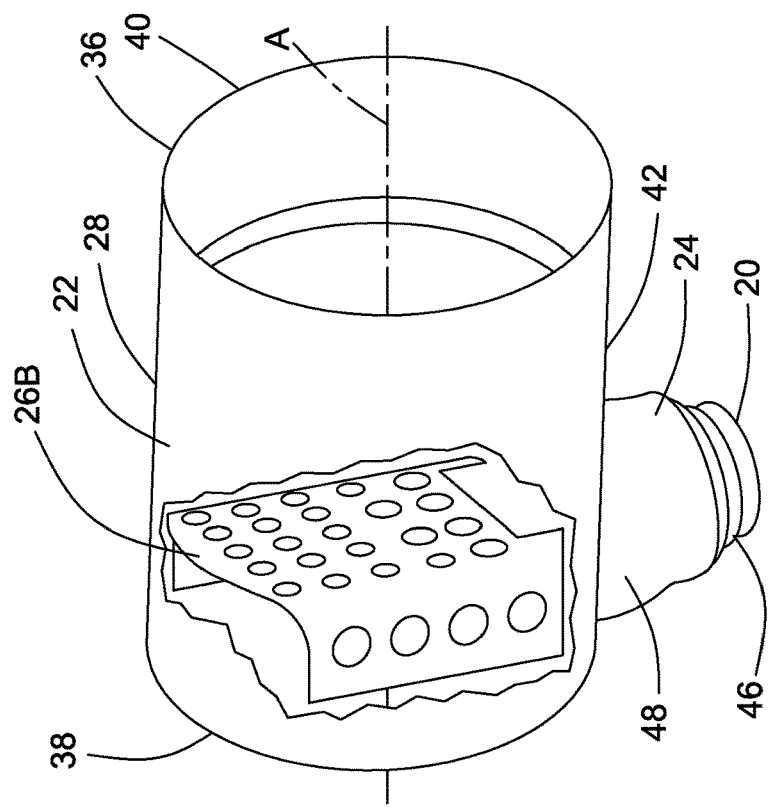
FIG. 2 is a perspective, cutaway view an exhaust aftertreatment system including an inlet diffuser according to an embodiment of the disclosure.
Figure 3:
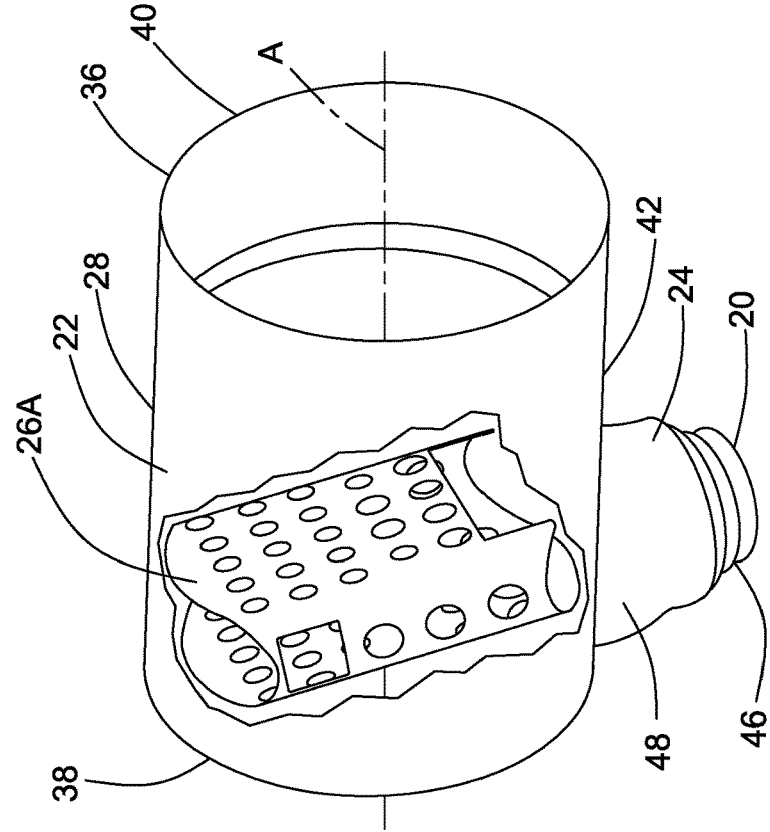
FIG. 3 is a perspective, cutaway view an exhaust aftertreatment system including an inlet diffuser according to a second embodiment of the disclosure.

Referring also to FIGS. 2 and 3, the inlet 24 may have a cylindrical portion 46 and a cone shaped portion 48 that widens as it approaches and terminates at the first housing 36. The shape of the inlet 24 may reduce the velocity of the exhaust gas and permit it to disperse more effectively. The inlet 24 is configured such that the exhaust gases enter the exhaust aftertreatment system 22 flowing non-axially as will be described in detail hereinbelow.

In the subject embodiment, the exhaust aftertreatment system 22 includes a flow diffuser 26 connected to the inlet 24 or otherwise positioned to receive exhaust gases from the inlet and disposed near the first axial end 38 inside the first housing 36. The exhaust aftertreatment system 22 includes a catalytic converter 28, such as a diesel oxidation catalyst (DOC), disposed downstream of the diffuser 26 and in the first housing 36.

The exhaust aftertreatment system 22 may include a diesel particulate filter 30, and other optional exhaust gas treatment devices for removing pollutants from the exhaust gas disposed in the housing downstream of the catalytic converter 28. Other exhaust gas treatment devices may be disposed in a separate, second housing 44.

Catalytic converters 28 (e.g., diesel oxidation catalysts) are typically used in an exhaust system to convert undesirable gases such as carbon monoxide and hydrocarbons from a vehicle's exhaust into carbon dioxide and water. Diesel oxidation catalysts can have a variety of known configurations. Exemplary configurations include substrates defining channels that extend completely therethrough. The substrates may include a catalyst. For example, the substrate can be made of a catalyst, impregnated with a catalyst or coated with a catalyst. Exemplary catalysts include precious metals such as platinum, palladium and rhodium, and other types of components such as base metals or zeolites.

While the exhaust aftertreatment system 22 will be described as including a catalytic converter 28, it will be understood that the scope of the present disclosure is not limited to a DOC as there are various catalyst devices that can be used in accordance with the principles of the present disclosure. As noted above, uneven exhaust gas flow and uneven distribution of dosing adjuncts can lead to inefficient or ineffective exhaust treatment and a shorted operating life of the component.

The diesel particulate filter 30 (DPF), on the other hand, is typically used in an exhaust system to remove particulate matter (e.g., carbon based particulate matter such as soot) from the exhaust. DPFs can have a variety of known configurations. An exemplary configuration includes a monolith ceramic substrate having a "honey-comb" configuration. Wire mesh configurations can also be used. In certain embodiments, the substrate can include a catalyst. Exemplary catalysts include precious metals such as platinum, palladium and rhodium, and other types of components such as base metals or zeolites.

The other exhaust gas treatment devices may include a selective catalytic reduction (SCR) catalyst device 34, such as a lean NOx catalyst device, a lean NOx trap, or other devices for removing pollutants from the exhaust stream. As these types of aftertreatment devices are well known to those skilled in the art, the aftertreatment devices will only be briefly described herein.

The selective catalytic reduction (SCR) catalyst 34 is typically used in an exhaust system to remove undesirable gases such as nitrogen oxides (NOx) from the vehicle's emissions. Selective catalytic reduction catalyst devices 34 are capable of converting NOx to nitrogen and oxygen in an oxygen rich environment with the assistance of reactants such as urea or ammonia, which are injected into the exhaust stream upstream of the SCR as is well known. The selective catalytic reduction catalyst 34 is also capable of converting NOx to nitrogen and oxygen. In contrast to SCRs, lean NOx catalysts use hydrocarbons as reducing agents/reactants for conversion of NOx to nitrogen and oxygen. The hydrocarbon is injected into the exhaust stream upstream of the lean NOx catalyst. At the lean NOx catalyst, the NOx reacts with the injected hydrocarbons with the assistance of a catalyst to reduce the NOx to nitrogen and oxygen. In one embodiment, the engine system 10 includes a SCR catalyst 34 disposed downstream from the DOC 28 and particulate filter 30 and in the second housing 44 separate from the first housing 36.

The exhaust aftertreatment system 22 may include sensors 50, 52 as is well known, to sense and in use for controlling, for example, dosing or other aspects of the operation of the system 10. A first sensor 50 may be a temperature sensor disposed to sense the temperature at or near the inlet 24 of the exhaust gases entering the exhaust aftertreatment system 22. A second sensor 52 may be disposed to sense the temperature of the exhaust gases at or after the catalytic converter 28.

The diffuser 26 is positioned and configured to evenly distribute exhaust gas 20 from the engine 12 to the catalytic converter 28. Referring now to FIGS. 2 and 3, the housing 36 of the exhaust aftertreatment system 22 has a first axial end 38 and an oppositely disposed second axial end 40 positioned downstream from the first axial end. The housing 36 extending between the first axial end 38 and the second axial end 40 may be cylindrical or generally elongate, the shape and size of which may define a longitudinal axis A.

The exhaust gases entering the inlet 24 enter the first housing 36 in a direction that is not parallel to the axis A. In one embodiment, the exhaust gases may be angled from the axis A due to bends in the conduit 20 or due to the axis of the inlet 24 being angled relative from the axis A of the first housing. In the subject embodiment, inlet 24 is disposed in a sidewall 42 of the housing 36 adjacent to the first axial end 38 with the exhaust gas from the inlet 24 entering the interior of the housing at an angle relative to the axis A. The angle may be about 90 degrees, or normal to axis A, for example.

The second axial end 40 of the first housing 36 includes the outlet 32 (see FIG. 1). In the subject embodiment, the flow diffuser 26 (26A in FIG. 2, 26B in FIG. 3), which will be described in detail subsequently, is disposed within the first housing 36 and positioned adjacent to and in communication with the inlet 24. The catalytic converter 28 is disposed within the first housing 36 and positioned between the flow diffuser 26 and the outlet 32.

The diffuser 26A, 26B is shown in position near the first axial end 38 of housing 36 and positioned to receive exhaust gas from inlet 24 and evenly disperse the exhaust gases for entry into and passage through the catalytic converter 28.

Figure 4:
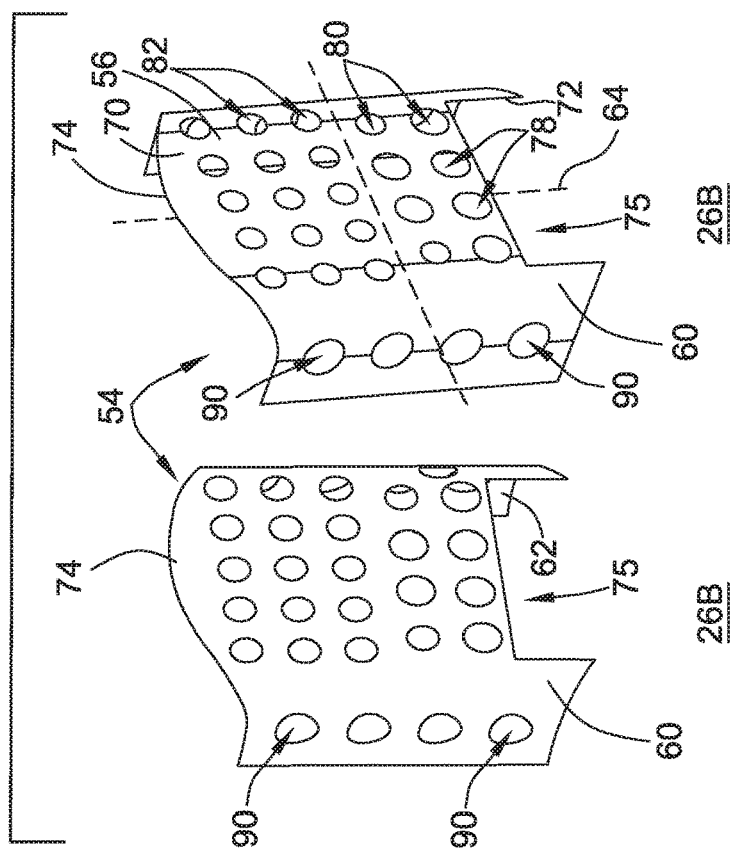
FIG. 4 is a perspective front view of the inlet diffuser of FIG. 2.
Figure 6:
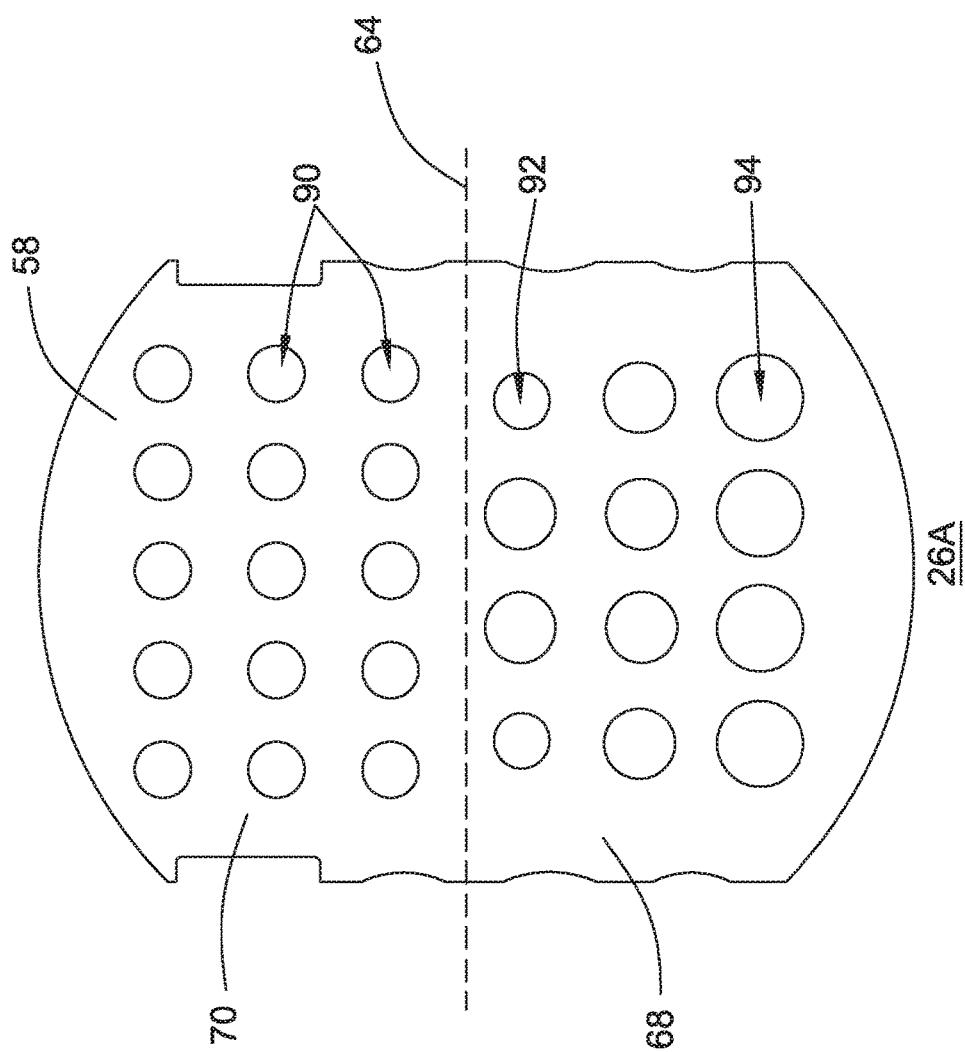
FIG. 6 is a rear view of the inlet diffuser of FIG. 2.

Referring to FIGS. 2, 4, and 6, a first embodiment of a diffuser 26A is shown. The diffuser 26A includes a perforated shell 54. The shell 54 includes four sides, a front side 56, a rear side 58 opposite the front side, and opposing left and right sides 60, 62. The front side 56 faces the catalytic converter 28 (see FIG. 2). The rear side 58 faces away from the catalytic converter 28 (see FIG. 2). The left and right sides 60, 62 are the same in configuration.

The shell 54 may be generally rectangular with an optional rounded shape where one side transitions to an adjacent side and with a longitudinal shell axis 64. The shell 54 may also separated into two virtual halves by way of a midline 66 transverse to the longitudinal axis 64 to define a proximal portion 68 that is disposed closest to the inlet 24 and a distal portion 70 that is distant from the inlet (see FIG. 2). The midline 66 is disposed halfway between a proximal terminus 72 of the proximal portion 68 and a distal terminus 74 of the distal portion 70.

The edges of the sides defining the proximal terminus 72 and the distal terminus 74 may be arcuate so as to fit within a cylindrical or rounded housing. In one embodiment, the fit of the proximal terminus 72 and the distal terminus 74 may form a seal and/or function to hold the shell 54 in position. In particular, the diffuser 26A rear side 58 may be arcuate at some or all of both the proximal terminus 72 and the distal terminus 74. In the illustrated embodiment, the diffuser 26A front side 56 may be arcuate at only at the distal terminus 74.

The front side 56 of diffuser 26A has a frontal area with a plurality of front side openings 76 formed therethrough. The frontal area will be considered to be the total area of the shell material and the openings formed therethrough of the relevant front side part. The dimensions of the front side of an embodiment are 287 millimeters (mm) long (along axis 64) by 218 mm wide (transverse to axis 64). Therefore, the frontal area is 6256.6 mm. The frontal area of each of the distal and proximal portions 68, 70 is half of 6256.6 mm.

The plurality of front side openings define an open area, which gases may pass through. The combined open area of all of the front side openings 76 of the proximal portion 68 of the front side 56 may be about twice the open area of all of the front side openings of the distal portion 70 of the front side.

The difference in open area between proximal portion 68 and distal portion 70 can be achieved in a number of ways. Generally, in one embodiment, the size of the openings (i.e., area) can be made greater in the proximal portion 68 and relatively smaller in the distal portion 70 of the front side 56. The proximal portion 68 may include a mix of different sized and/or shaped openings, the combined area of which is greater (i.e. about two times) that of the combined area of the openings formed through the distal portion. For example, the proximal portion 68 may include a relatively large cutaway 75 at the proximal terminus 72, two or more relatively large circular openings 78 downstream of the large cutaway, and a plurality of relatively smaller circular openings 80 downstream and/or off axis relative to longitudinal axis 64 and the large circular openings. The distal portion 70 may include a plurality of circular openings 82 similar in diameter to openings 80.

It will be understood that the impedance or resistance to airflow through the total area of the openings 82 in the distal portion 70 is to be made greater than what is provided by openings 75, 78, 80 of the proximal portion 68. Because of the angle of the inlet 24 into the diffuser 26A, the airflow tends to be directed toward the far end of the distal portion 70 of the diffuser 26A and there may be greater air pressure build up and/or turbulence in the interior of the distal portion 70. The smaller relative area of the openings in the distal portion 70 causes a restrictive effect through the distal portion of the diffuser 26A and the larger relative open area in the proximal portion 68 permits a flow through, in terms of volume of air, that is approximately the same as through the distal portion.

In order to provide an even distribution of gases, the openings 82 of the distal portion 70 may be evenly spaced from one another. Similarly, the openings 78, 80 of the proximal portion 68 may have even or regular spacing.

The sides 60, 62 of the diffuser 26A include a plurality of side openings. In particular, the distal portion 70 may include one or more optional rectangular opening 84, and optionally may include one or more circular opening 86. The proximal portion of the sides 60, 62 may include one or more circular opening 88.

Referring to FIG. 6, which shows the rear side 58 of the embodiment of a diffuser 26A shown in FIGS. 2 and 4, a plurality of rear side openings are provided in both the proximal portion 68 and the distal portion 70. The rear side openings 90 of the distal portion 70 may each be the same in diameter. The rear side openings of the proximal portion 68 may include a first set of openings 92 that are of similar diameter relative to the openings 90 of the distal portion 70. The openings of the proximal portion 68 may include a second set of openings 94 that are of greater diameter relative to the openings 90 of the distal portion 70 and the total open area of the openings 90 provide less total open area then openings 92, 94 of the proximal portion 68.

Figure 5:
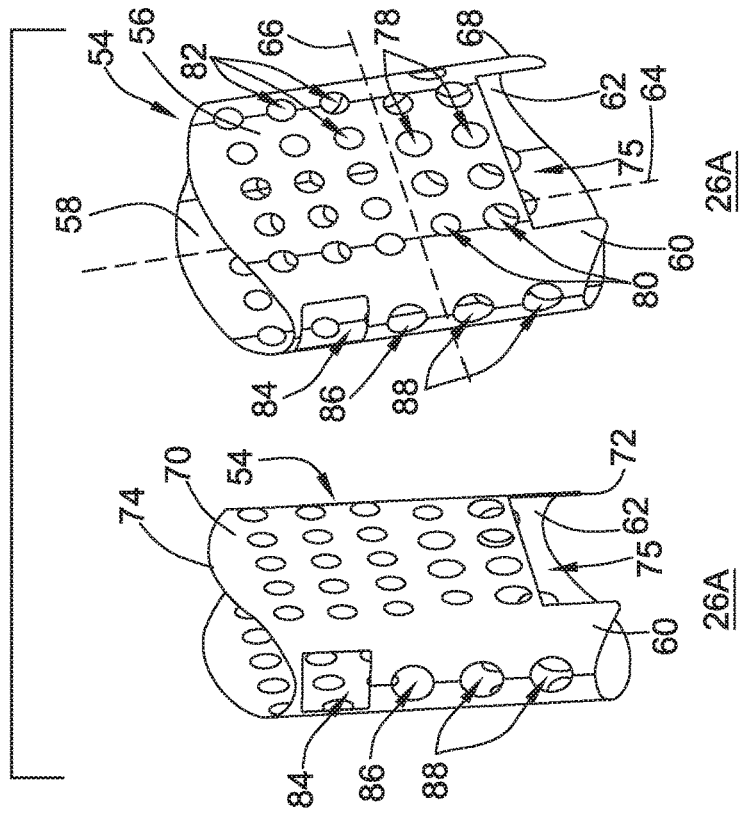
FIG. 5 is a perspective front view of the inlet diffuser of FIG. 3.

Turning to the embodiment of FIGS. 3 and 5, diffuser 26B is the same general shape and configuration as diffuser 26A. Diffuser 26B has the same configuration of openings 75, 78, 80, and 82 on the front side 56.

Diffuser 26B lacks a rear side. Diffuser 26B is open where diffuser 26A includes a structural panel with openings. Diffuser 26B includes a plurality of rear side openings 90 that are of the same diameter in both proximal and distal portions 68, 70.

In one embodiment, the diffuser 26A, 26B has an overall length of about 287 millimeters (mm) and a width of about 218 mm. The openings 82 of the distal portion 70 may be about 20 mm in diameter. The openings 80 of the proximal portion 68 may be about 25 mm in diameter. The overall depth of the diffusers 26A, 26B may be about 82 mm. The radius of the distal terminus may be about 154 mm. The open area of the cutaway 75 may be about 9500 square millimeters (sqmm). The open area of diffuser 26B may be a ratio of about 1:2.1 (distal/proximal) or about 0.4723. The open area of diffuser 26A may be a ratio of about 1:1.84 (distal/proximal) or about 0.5443.

In use, the engine system 10 generates exhaust gases during operation. The exhaust gases travel from engine 12 through exhaust conduit 20. The exhaust gases enter the housing 36 of exhaust aftertreatment system 22 via inlet 24. The exhaust aftertreatment system 22 includes a diffuser 26 that is configured to distribute evenly the exhaust gases from the inlet 24 for passage through a catalytic converter 28 positioned downstream of the diffuser. The diffuser 26 includes a proximal portion 68 disposed adjacent the inlet 24 and a distal portion 70 distant from the inlet. Exhaust gases pass through openings provided in the proximal portion 68 and the distal portion 70, wherein the combined total of the area of the plurality of openings respectively define a first open area defined by a first plurality of openings and a second open area defined by a second plurality of openings. The first open area is about twice the second open area. Accordingly, flow through the plurality of openings of the second open area is restricted relative to flow through the plurality of openings of the first open area.

INDUSTRIAL APPLICABILITY

The present disclosure is applicable to diffuser configurations for distributing exhaust gases evenly upstream of a catalytic converter. The diffusers may be used in a mobile or non-mobile application to treat exhaust gases from a diesel engine. Providing an evenly distributed flow of exhaust gases in an exhaust gas treatment that is compact and non-linear in configuration ensures optimal treatment of exhaust gases and provides long operational life of the catalytic converter.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An exhaust aftertreatment system, comprising:
a housing including a first axial end and a second axial end;
an exhaust inlet disposed at or near the first axial end and supplying engine exhaust to the housing;
an exhaust outlet disposed at or near the second axial end;
a catalytic converter disposed in the housing between the first and second axial ends; and
a diffuser disposed inside the housing between the first axial end and the catalytic converter, the diffuser including:
a shell in communication with the exhaust inlet and configured to receive and diffuse the engine exhaust, the shell including a front side facing the catalytic converter, the front side including:
a proximal portion and a distal portion opposite the proximal portion, the proximal and distal portions being substantially equal in frontal area,
the proximal portion disposed adjacent the exhaust inlet including a first plurality of front side openings directed generally axially toward the catalytic converter and totaling a first open area, and
the distal portion including a second plurality of front side openings directly generally axially toward the catalytic converter and totaling a second open area wherein the first open area is about 1.8-2.2 times the second open area.

2. The exhaust aftertreatment system of claim 1, wherein the housing has a longitudinal housing axis and the shell has a longitudinal shell axis generally aligned with the exhaust inlet such that the exhaust inlet and longitudinal shell axis are disposed to direct exhaust gas into the housing in a direction angled relative to the longitudinal housing axis.

3. The exhaust aftertreatment system of claim 2, wherein the exhaust inlet and longitudinal shell axis direct exhaust gas into the housing in a direction about normal to the longitudinal housing axis.

4. The exhaust aftertreatment system of claim 1, wherein the exhaust inlet includes a cylindrical portion and a cone shaped portion attached to the cylindrical portion, the cone shaped portion attached to the housing.

5. The exhaust aftertreatment system of claim 1, wherein the catalytic converter includes a diesel oxidation catalyst.

6. The exhaust aftertreatment system of claim 1, further including a dosing system configured to dose into one of the housing and the diffuser.

7. The exhaust aftertreatment system of claim 1, wherein the first open area is about twice the second open area.

8. The exhaust aftertreatment system of claim 1, wherein the shell lacks a rear side.

9. The exhaust aftertreatment system of claim 1, wherein the shell further includes a left side and a right side opposite the left side, the left and right sides including a plurality of side openings.

10. The exhaust aftertreatment system of claim 9, further including a rear side opposite the front side, the rear side including a plurality of rear side openings through which exhaust gas may pass into the housing.

11. The exhaust aftertreatment system of claim 1, wherein most of the plurality of openings are circular.

12. The exhaust aftertreatment system of claim 11, wherein the plurality of openings include circular openings of different diameters.

13. The exhaust aftertreatment system of claim 1, wherein the first plurality of front side openings includes at least one cutaway portion that constitutes more than half the first open area.

14. The exhaust aftertreatment system of claim 1, further comprising a particulate filter downstream of the catalytic converter.

15. The exhaust aftertreatment system of claim 14, further comprising a selective catalytic reduction catalyst downstream of the particulate filter.

16. The exhaust aftertreatment system of claim 15, wherein the selective catalytic reduction catalyst is separately housed from the diffuser and catalytic converter.

17. An engine system; comprising:
an engine supplied with fuel and air; and
an exhaust aftertreatment system configured to receive exhaust gases from the engine, comprising:
a housing including a first axial end and a second axial end;

an exhaust inlet disposed at or near the first axial end and supplying engine exhaust to the housing;

an exhaust outlet disposed at or near the second axial end;

a catalytic converter disposed in the housing between the first and second axial ends; and a diffuser disposed inside the housing between the first axial end and the catalytic converter, the diffuser including:

a shell in communication with the exhaust inlet and configured to receive and diffuse the engine exhaust, the shell including a front side facing the catalytic converter, the front side including:

a proximal portion and a distal portion opposite the proximal portion, the proximal and distal portions being substantially equal in frontal area, the proximal portion disposed adjacent the exhaust inlet and including a first plurality of front side openings directed generally axially toward the catalytic converter and totaling a first open area, and the distal portion including a second plurality of front side openings directed generally axially toward the converter and totaling a second open area wherein the first open area is from about 1.8 to about 2.2 times the second open area.

18. A method of operating an exhaust aftertreatment system, comprising:

generating, by an engine, exhaust gases;

conveying, through an exhaust conduit, the exhaust gases from the engine to the exhaust aftertreatment system;

directing the exhaust gases into a diffuser;

diffusing the exhaust gases through a plurality of openings formed through a front side of the diffuser facing a catalytic converter, wherein the openings include a first plurality of openings formed through a proximal portion of the diffuser and directed toward the catalytic converter and a second plurality of openings formed through a proximal portion of the diffuser and directed toward the catalytic converter; and restricting flow through the second plurality of openings relative to flow through the first plurality of openings.

19. The method of operating an exhaust aftertreatment system of claim 18, further comprising a catalytic converter disposed downstream of the diffuser.

20. The method of operating an exhaust aftertreatment system of claim 18, wherein a combined total area of the first plurality of openings define a first open area and a combined total area of the second plurality of openings define a second open area, wherein the first open area is from about 1.8 to about 2.2 times the second open area.

\* \* \* \* \*